Patented Jan. 12, 1937

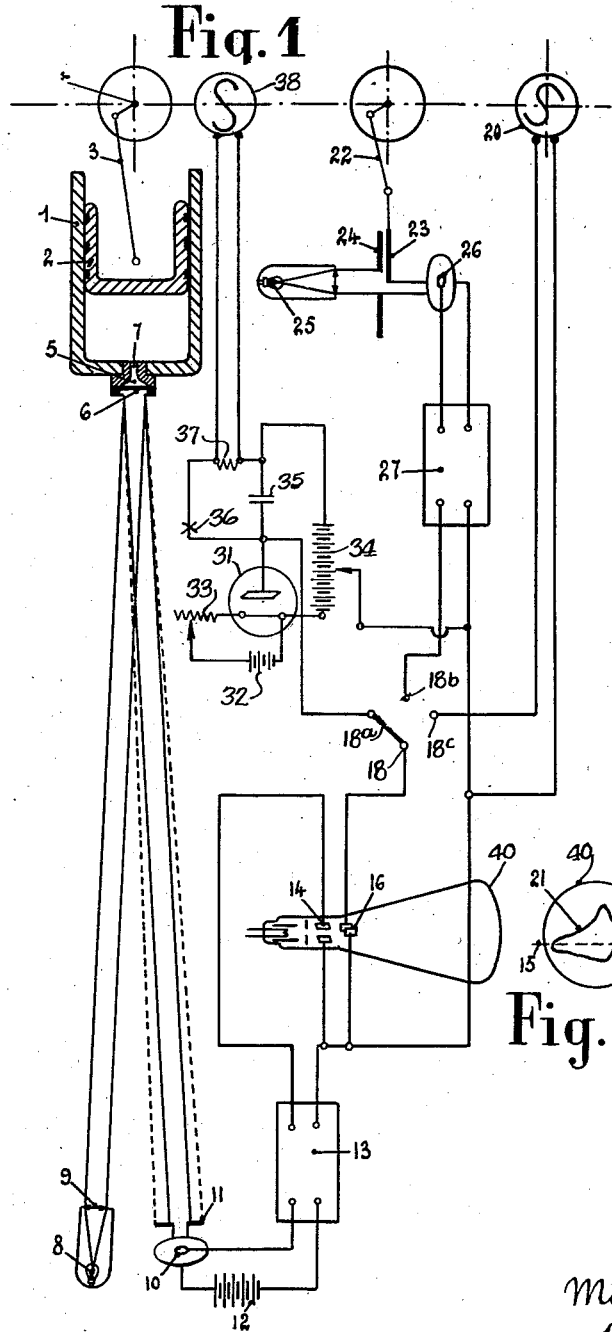

2,067,262

UNITED STATES PATENT OFFICE 2,067,262

DEVICE FOR MEASURING PRESSURE VARIATIONS

Marcel Demontvignier, Suresnes, and
André Labarthe, Paris, France

Application November 1, 1933, Serial No. 696,286
In France November 17, 1932

6 Claims. (Cl. 73—185)

This Application has been filed in France on November 17, 1932.

The present invention relates to devices for indicating the variations of pressure of the working fluid of an engine, and especially for automatically tracing a diagram showing the value of the pressure of the working fluid in an engine either as a function of time, or as a function of the volume of the mass of working fluid that is studied.

The invention may also be used for producing diagrams of the pressure variations of fluids operating in refrigerating machines, pumps, compressors, hydraulic machines, guns, fuses and other apparatus.

The invention may further be applied to study the turbulence of the fluids, to detect sounds and ultra-audible vibrations, or to study mechanical accelerations.

The devices usually employed for determining rapid and periodical variations of pressure such as occur in high speed thermal engines, may be of two general types, those giving stroboscopic indications and those comprising a very light movable armature and giving an instantaneous indication. Devices of the first type which only give a mean or average indication of the successive cycles, are not able to disclose sporadic anomalies, the study of which may be very important; devices of the second type may be divided into two classes, viz., devices giving optical indications and devices producing a record by mechanical means. Devices of the latter type (which have been almost completely abandoned) give a diagram which is extremely small and scarcely usable for accurate measurements. As to the optical devices, they hardly render possible a combination of movements giving the pressure-volume diagram. None of these apparatus renders it possible to study the variations of pressure beyond 25 to 30 cycles per second.

The object of the present invention is to obviate these disadvantages.

The essential feature of the invention consists in causing a light beam of predetermined shape to fall onto a reflecting face of a diaphragm the opposite face of which is subjected to the pressure of the fluid in the engine, and in causing the reflected beam of light from said surface to act on a light sensitive device, preferably an electro-optical device such as a photo-electric cell, responsive to variations of the light flux per unit of area across said reflected beam. The light sensitive device is adapted to render perceptible the variations of said light flux. For instance if it consists of a photo-electric cell it transforms the variations of light flux into variations of an electric current which, after suitable amplification produce displacements of a visible spot on a screen in the direction of a given axis of coordinates, for instance by means of an oscillograph.

Means are provided for causing said spot to move simultaneously on said screen in the direction of another axis of coordinates in accordance with variations of any desired variable, for instance time, or the volume of the mass of fluid that is studied in the engine.

The accompanying drawing shows, by way of example, an apparatus for carrying out the present invention.

Fig. 1 shows a diagrammatic view of the device adapted for the study of the fluid operating in the cylinder of a piston engine.

Fig. 2 shows a diagram of the pressure as a function of the volume.

Fig. 3 is a diagram showing the pressure as a function of time as delineated by the spot of light.

Referring now to Fig. 1, a thermal engine cylinder 1, for example the cylinder of an internal combustion engine is shown, wherein the fluid pressure varies under the action of a piston 2 connected to the connecting rod and crank driving the shaft 4. In the cylinder head is screwed a small pressure chamber 5 communicating with the interior of the cylinder by means of the conduit 7 and closed by an elastic and reflecting diaphragm 6.

A beam of light emitted by a source of light 8 and rendered parallel, convergent or divergent by means of a suitable optical device, for example a lens 9, falls on the reflecting diaphragm, in front of which may be provided a screen, and is reflected so as to fall on a photo-electric cell 10 in front of which is placed a diaphragm 11. The photo-electric current furnished by a direct current source, such as a storage battery 12, passes through an amplifier 13 such as for example a triode valve amplifier. The output terminals of the latter are connected to the first pair of deflecting plates 14 of the cathodic oscillograph which cause the deflections of the cathodic beam in the direction of the axis of pressures 15. In the usual manner, the cathodic beam produces a fluorescent spot on the screen 40 formed at the end of the glass tube of the oscillograph. The pressure variations of the fluid contained in the cylinder 1 cause variations of curvature of the diaphragm 6 which works successively for increasing pressures first like a concave, then like a plane, then like a convex mirror, inasmuch as when the pressure is low in the chamber 5, the said diaphragm is externally concave, then as the pressure increases it exhibits a plane surface, and when the pressure still further increases it presents a convex surface towards the exterior. An increase of pressure thus causes an increase in the divergence of the reflected beam and consequently a decrease in the luminous flux falling on to the cell 10 through the aperture of diaphragm 11. A variation of the photoelectric current is thus produced and causes a variation of the voltage on the output terminals of the amplifier 13. If the deformations of the diaphragm and the variations of incident light in the cell are weak and the amplifier 13 without distortion, the variations of the voltage applied on the deviating plates 14 will be proportional to the variations of pressure as will also be the deflections of the fluorescent spot on the screen 40.

It is obvious that, without altering the result, there may be inserted in the path of both the incident and the reflected beams any suitable optical systems such as lenses modifying the convergence of the beams of light or mirrors or prisms changing their direction.

The other pair of deflecting plates 16 give deflections of the fluorescent spot on screen 40 in the direction of the axis 17 of the coordinates (Figs. 2 and 3).

When the arm of switch 18 is on contact 18ª, the voltage impressed on plates 16 varies as a function of time but in synchronism with the cycle of the engine. In other words, the voltage impressed on plates 16 undergoes a succession of increases or decreases, as a linear function of time, separated from one another by sudden, and practically instantaneous, decreases or increases, respectively, of said voltage, whereby the curve showing the variation of said voltage as a function of time has a saw-toothed shape, the period of said voltage variation being equal to, or being a multiple or a sub-multiple of, the period of the cycle of the engine. Voltage variations of this kind can be obtained through known oscillators, for instance a relaxation oscillator of the type disclosed by French Patent No. 635,353.

Such an oscillator includes a two-electrode tube 31, the filament of which is fed from a source 32 through a rheostat 33. A source of continuous current 34 the negative terminal of which is connected to source 32 feeds current to the anode of tube 31 through a condenser 35. A neon tube 36 and a small resistance 37 connected together in series are connected, in shunt relation, to the terminals of said condenser 35. An alternator 38, keyed on the shaft 4 of the engine, feeds an alternating potential difference of relatively low value to the terminals of resistance 37.

When the arm of switch 18 is on contact 18ª, the plates 16 of the oscillograph are connected with the circuit of this oscillator and the diagram 19 (Fig. 3) traced on the fluorescent spot on the screen 40 of the oscillograph shows the variation of the pressure of the working fluid in the engine as a function of time.

When the arm of switch 18 is on contact 18ᶜ, the voltage variations impressed on plates 16 of the oscillograph are produced by an alternator 20 keyed on the shaft 4 of the engine in such manner that the maxima and the minima of said voltage correspond to the dead center positions of piston 2. On the screen 40 of the oscillograph, there will thus be obtained a curve such as 21 (Fig. 2), corresponding to the pressure volume diagram in the case of a connecting rod of infinite length.

Finally, when the arm of switch 18 is on contact 18ᵇ, the voltage variations impressed on the plates 16 of the oscillograph are proportional to the displacements of piston 2, and therefore to the volume of working fluid in the engine cylinder. These voltage variations are, for instance, obtained as follows:

A crank and connecting rod system 22 exactly similar to the corresponding system 3 of the engine is keyed on the shaft 4 of said engine and drives an opaque shutter 23, displacing it in front of a window 24; a source of light 25 projects, through the medium of a suitable optical system, a light beam through the portion of the window uncovered by shutter 23 and the beam of light passing therethrough falls on a photo-electric cell 26. The current of cell 26, amplified by the amplifier 27 is fed through switch 18 to the second pair of deflecting plates 16. By suitably adjusting the dimensions of the window 24, the result may therefore be obtained that the luminous flux falling on to the cell 26 will be proportional to the volume of the fluid contained in the cylinder. Under these conditions and if the amplifier does not introduce any distortion, the displacement of the spot on the screen in the direction of the axis 17 will also be proportional to the fluid volume which permits of directly obtaining the desired pressure volume diagram.

The system shown in Fig. 1 offers numerous advantages particularly as regards the optical device for studying the pressures.

One of the advantages of the device resides in the fact that it permits of reducing to a minimum and even eliminating the prejudicial space between the interior of the cylinder and the internal face of the diaphragm.

The diaphragm may be of variable thickness according to the extent of the pressures to be explored; it is made of a material which is as little as possible subject to the variations of elasticity as a function of the temperature and it may be maintained on a constant temperature by any suitable known means preferably water circulation in the diaphragm or the adjacent parts; it may be of as small dimensions as may be desired and its natural frequency may be reduced to as great an extent as it is desired, for it is possible to electrically amplify very slight variations of convergence of the reflected beam of light.

Another advantage of this device resides in its complete insensibility to the vibrations of the engine, under the condition (which, moreover, is easily realized), that the reflected beam of light always covers the diaphragm of the cell, even under the conditions of maximum convergence.

The described devices offer besides the advantages of a total absence of inertia, of the absence of mechanical connection permitting of investigating rotary engines or inaccessible engines, and of easy and accurate calibration of the scale of pressures by means of a static pressure which may be applied to the diaphragm under the same thermal conditions.

It is obvious that the cathodic oscillograph may be replaced by any other device permitting of displacing a spot of light on a screen according to two axes of coordinates as a function of two electric variables.

We claim:

1. In connection with an engine including a chamber in which a fluid undergoes rapid variations of pressure, said chamber being provided with an aperture in one of its walls, a device for indicating the variations of said pressure which comprises, in combination, a diaphragm one side of which has a reflecting surface, a diaphragm carrier adapted to be fixed directly to a wall of said chamber so as to connect the other side of said diaphragm with the inside of said chamber through said aperture, means for projecting a light beam of predetermined shape onto said reflecting surface, a cathodic oscillograph, a screen for the cathodic spot of said oscillograph, deviating means in said oscillograph for displacing said cathodic spot parallelly to a axis of coordinates of said screen, photo-electric means, responsive to variations of the light flux per unit of area across the light beam reflected from said surface of the diaphragm, for controlling said deviating means, deviating means in said oscillograph for displacing the cathodic spot thereof parallelly to another axis of coordinates of said screen, and means for controlling the last mentioned deviating means.

2. In connection with an engine including a chamber in which a fluid undergoes rapid variations of pressure, said chamber being provided with an aperture in one of its walls, a device for indicating the variations of said pressure which comprises, in combination, a diaphragm one side of which has a reflecting surface, a diaphragm carrier adapted to be fixed directly to a wall of said chamber so as to connect the other side of said diaphragm with the inside of said chamber through said aperture, means for projecting a light beam of predetermined shape onto said reflecting surface, a cathodic oscillograph, a screen for the cathodic spot of said oscillograph, a pair of plates in said oscillograph for deviating said cathodic spot parallelly to an axis of coordinates of said screen in accordance with the voltage impressed on said plates, a photo-electric cell operative by the light flux passing through a fixed section of the light beam reflected from said surface of the diaphragm, means, including an amplifier, for connecting the electric terminals of said cell with said plates, another pair of plates in said oscillograph for deviating said cathodic spot parallelly to another axis of coordinates of said screen in accordance with the voltage impressed on said plates, and means for impressing voltage oscillations on said last mentioned pair of plates.

3. A device according to claim 2 in which the last mentioned means include an alternator driven in synchronism with the engine and means for connecting the terminals of said alternator with said second mentioned pair of plates respectively.

4. In the case of an engine including a cylinder, a piston movable in said cylinder, a shaft, and means for interconnecting the reciprocating relative movement of said piston and said cylinder with the revolving movement of said shaft, a device according to claim 2 for indicating the variation of pressure in the chamber limited by said piston and said cylinder, in which the last mentioned means of claim 2 includes, a photo-electric cell, a source of light adapted to project a light beam onto said last mentioned cell, a shutter movable across the path of the last mentioned light beam, means operative by said shaft for imparting to said shutter with respect to said last mentioned light beam a movement identical to the relative movement of said piston and said cylinder, whereby the light flux allowed to flow past said shutter to said last mentioned photo-electric cell is proportional to the volume of said chamber, and means for connecting the electric terminals of said second mentioned photo-electric cell to the second pair of plates, respectively.

5. A device according to claim 2, in which the last mentioned means comprise a relaxation oscillator adapted to give periodical variations of voltage which are linear as a function of time and the period of which corresponds to that of the cycle of the engine, means for synchronizing said oscillator with the cycle of said engine, and means for coupling said oscillator with said second mentioned pair of plates of said oscillograph.

6. A device according to claim 2, in which the last mentioned means comprise a relaxation oscillator adapted to give periodical variations of voltage which are linear as a function of time and the period of which corresponds to that of the cycle of the engine, an alternator operatively connected with said engine and coupled with said oscillator so as to synchronize said oscillator with the cycle of said engine, and means for coupling said oscillator with said second mentioned pair of plates of said oscillograph.

MARCEL DEMONTVIGNIER.
ANDRÉ LABARTHE.